US010887672B1

(12) United States Patent
Wu et al.

(10) Patent No.: US 10,887,672 B1
(45) Date of Patent: Jan. 5, 2021

(54) DYNAMIC DETECTION OF SEGMENT PATTERN

(71) Applicant: Amazon Technologies, Inc., Seattle, WA (US)

(72) Inventors: Yongjun Wu, Bellevue, WA (US); Parminder Singh, Seattle, WA (US); Sally Cheng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/522,468

(22) Filed: Jul. 25, 2019

(51) Int. Cl.
*H04N 21/8547* (2011.01)
*G06K 9/68* (2006.01)
*H04N 21/242* (2011.01)

(52) U.S. Cl.
CPC ......... *H04N 21/8547* (2013.01); *G06K 9/685* (2013.01); *H04N 21/242* (2013.01)

(58) Field of Classification Search
None
See application file for complete search history.

(56) References Cited

U.S. PATENT DOCUMENTS

| 2016/0127440 A1* | 5/2016 | Gordon | ............ H04N 21/23439 709/219 |
| 2017/0272485 A1* | 9/2017 | Gordon | ................. H04L 65/601 |
| 2017/0353516 A1* | 12/2017 | Gordon | ................... H04L 67/10 |
| 2018/0191586 A1* | 7/2018 | Chen | ........................ H04L 67/10 |
| 2018/0191587 A1* | 7/2018 | Chen | ........................ H04L 65/80 |
| 2018/0191801 A1* | 7/2018 | Chen | ..................... H04L 65/602 |

OTHER PUBLICATIONS

U.S. Appl. No. 16/367,651, "Higher Order Manifest Data Compression," as filed on Mar. 28, 2019.

* cited by examiner

*Primary Examiner* — Jeffrey R Swearingen
(74) *Attorney, Agent, or Firm* — Patterson + Sheridan, LLP

(57) ABSTRACT

Method and apparatus for detecting a pattern used by an encoder when outputting segments for HTTP streaming. A pattern detector receives, as part of a HTTP streaming protocol, a sequence of video segments and a sequence of audio segments forming at least a portion of a media presentation. The pattern detector identifies a duration of the video segments and then sums the durations of the sequence of audio segments until the summed duration is an integer multiple of the duration of the video segments. The pattern detector determines the number of the audio segments used to form the summed duration which includes the number of audio segments forming a cycle of the pattern. This pattern is then added to a manifest of the media presentation along with a repeat indicator defining the number of times the pattern is repeated.

20 Claims, 8 Drawing Sheets

DYNAMIC DETECTION OF SEGMENT PATTERN

BACKGROUND

For a variety of reasons it is generally desirable to keep the number of video segments of a media presentation the same as the number of audio segments, and to keep corresponding segments of the video and audio streams temporally aligned. Many video encoders are configured to generate video segments of fixed duration which is advantageous for efficiently generating a manifest (i.e., a list of segments and their locations which is used by user devices to acquire the segments of a media presentation). Also, a fixed duration allows for a sequence of many video segments to be collapsed into a single entry in the manifest.

On the other hand, because of the sampling rates associated with most audio codecs, the fixed duration of the video segments does not correspond to an integer multiple of audio frames. Therefore, in order to ensure the video segments and the audio segments align at a predetermined interval (e.g., every 2, 4, or 8 seconds), audio segments are typically generated with different durations; some slightly longer than the fixed video segment duration, and some slightly shorter. This allows for temporal alignment to be maintained at the predetermined interval. But this irregularity in audio segment durations has a downside in that the sequence of audio segments cannot be as efficiently represented in the manifest as the sequence of video segments. In fact, while the size of the video portion of the manifest might remain constant over the duration of a media presentation, the size of the audio portion of the manifest increases linearly with the number of audio segments. This can be problematic for some client devices as the manifest consumes local memory and processing resources.

DETAILED DESCRIPTION

This disclosure describes techniques for efficiently representing manifests (also referred to as playlists) for media presentations. Some media streaming protocols include repetition syntax by which a sequence of media segments having the same duration can be represented with a single entry. In one embodiment, a pattern syntax is introduced by which repeating patterns of segment durations are represented in manifests.

Figure 1A:
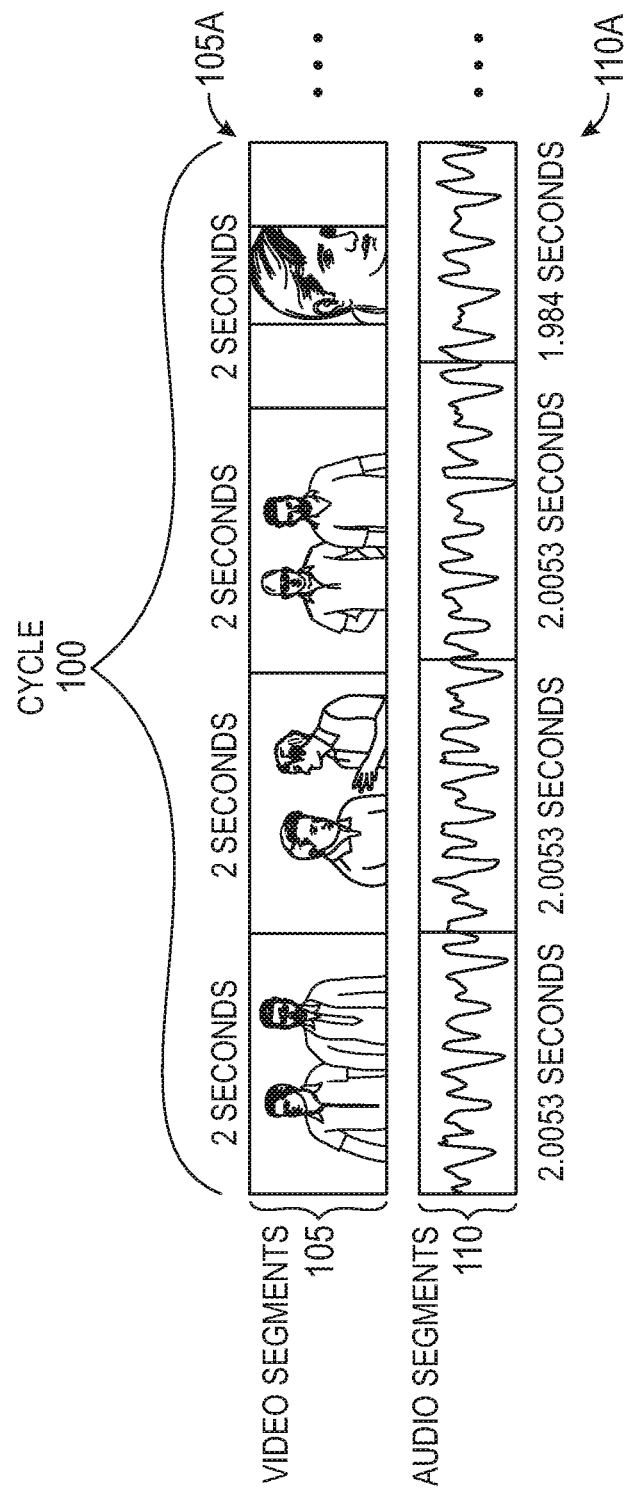
FIG. 1A illustrates video and audio segments of a media presentation, according to various embodiments.

Many encoders generate video segments with different lengths than audio segments. This is illustrated in FIG. 1A where video segments 105 have a 2 second duration while audio segments 110 have a slightly different duration—i.e., 2.0053 seconds. This difference in duration between the video and audio segments 105, 1110 is due to the different encoding techniques used for audio and visual data. Moreover, this difference can vary depending on the type of encoder used. This small difference in duration results in the video and audio segments 105, 110 being misaligned as shown in FIG. 1A. However, as mentioned above, it is often desirable to ensure that the video and audio segments align at least at a predetermined interval. In FIG. 1A, the encoder truncates or shortens the duration of the audio segment 110A so that the end of the audio segment 110A aligns with the end of the video segment 105A. The encoder can repeat this pattern so that the ends of every fourth one of video segments 105 and the audio segments 110 align (e.g., every 8 seconds of a media presentation) to form a repeating cycle 100. However, the shortened duration of the audio segment 110A (which occurs every 8 seconds) makes shrinking the size of manifest difficult, as described below.

A manifest generated according to the Dynamic Adaptive Streaming over HTTP (DASH) standard includes a list of video and audio segments representing the video component of a media presentation and a list of audio segments representing the audio component of the media presentation. Each entry (e.g., each SegmentTimeline or S element) in the manifest represents one or more segments in relation to the media timeline of the media presentation and includes a starting timestamp and a segment duration. The DASH standard includes syntax denoted "@r" (where the "@" is an integer indexed from "0") that, when included as an attribute of a segment entry, indicates a number of consecutive repetitions of segments having the specified duration.

Figure 1B:
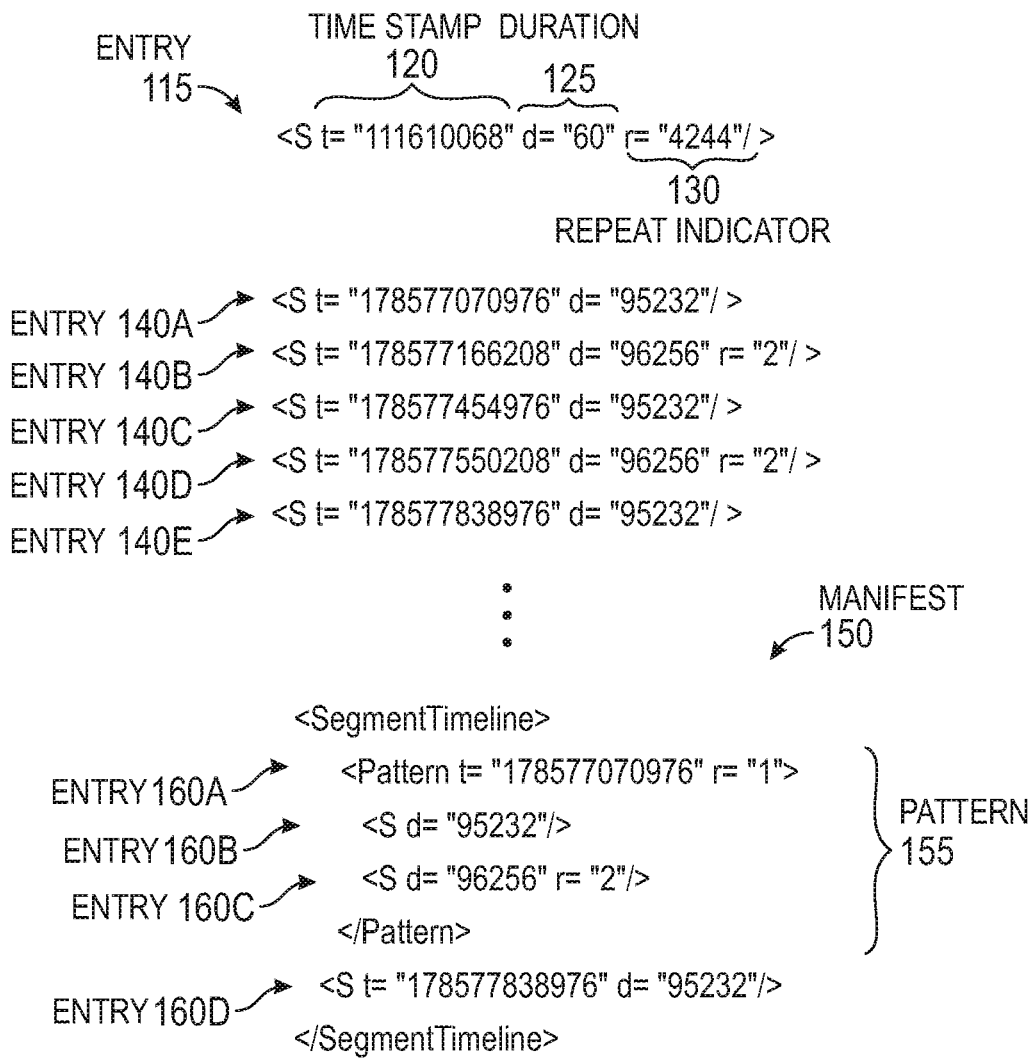
FIG. 1B illustrates entries in a manifest for a media presentation, according to various embodiments.

The entry 115 in FIG. 1B is an example of a manifest entry for representing a series of video segments in the media presentation. The entry 115 includes a timestamp 120, a duration 125, and a repeat indicator 130. The timestamp 120 (specified with the attribute "t") has a value "111610068" indicating a timestamp in the media presentation where the first segment of the segments represented by the entry 115 begins. The duration 125 provides length of each segment while the repeat indicator 130 means there are 4245 (since the repeat indicator starts at zero) consecutive segments in the media presentation with a duration of "60." In this manner, thousands of video segments can be represented by a single entry 115 in the manifest because the video segments have the same duration. For example, the video segments 105 in FIG. 1A can be represented by a single entry 115 in the manifest.

By contrast, because of the audio fragmentation issues discussed above, the number of audio segments in a row that have the same duration is relatively few (e.g., 3 as shown in FIG. 1A), resulting in a much longer list of S elements including, for example, a portion of a manifest that includes the entries 140 in FIG. 1B. These entries 140 indicate that, beginning at the timestamp "178577166208" (the timestamp in the entry 140B) there are three consecutive segments having the duration "96256" followed by a single segment represented by the entry 140C that begins at timestamp "178577454976" having the duration "95232." Thus, in this example, use of the DASH @r syntax only results in compression of four entries into two. This cycle then repeats in the audio portion of the manifest where there are three segments that are represented by one entry (i.e., the entries 140B and 140D which have the repeat indicator 130 "r=2")

followed by another segment represented by another entry (i.e., the entries 140A, 140C, and 140E) that do not have any repeat indicator and correspond to the audio segment 110A in multiple cycles 100. In contrast with the video segment entries in the manifest, despite the use of the @r syntax, the audio segment entries in the manifest grow linearly with the total duration of the media presentation.

According to various embodiments, a syntax is introduced by which repeating patterns of segment durations may be represented, thereby providing a second order of compression of manifest data beyond what is possible with a first-order compression syntax such as the DASH @r syntax. In one example, a pattern syntax can be used to indicate to the downstream user device that the manifest includes a pattern 155. In FIG. 1B, the pattern 155 is designated in the manifest 150 by a beginning syntax "Pattern" and an end syntax "/Pattern". However, this is just one example of suitable syntax for defining a pattern in an HTTP streaming protocol.

The pattern 155 in FIG. 1B includes various syntax used to represent repeating segments with varying durations. The manifest 150 may begin (and end) with the SegmentTimeline attributes. The start of the segments forming the pattern 155 is indicated by the Pattern attributes or syntax—"Pattern". The entry 160A includes a timestamp indicating when the first segment of the pattern 155 starts in the media presentation. The @r value in the entry 160A indicates how often the pattern repeats (twice in this example). Each time the encoder outputs segments that form the pattern, the @r value in the entry 160A is incremented. Thus, the pattern 155 can represent an intermediate state of the manifest 150 before the encoder has finished outputting all the segments in the media presentation.

The following entries in the pattern 155 (i.e., entries 160B and 160C) indicate the duration and number of the segments in the pattern. The entry 160B indicates that the duration of the first segment in the pattern is "95232" and does not repeat (since there is no @r value). The entry 160C indicates the duration of the next three segments (since the @r has a value of three) is "96256." Thus, the pattern 155 repeats twice and includes four segments: a first segment followed by three segments with the same duration. The pattern portion of the manifest is closed using the end syntax or attribute "/Pattern".

The manifest 150 also includes the entry 160D which is a segment that does not fit in the pattern 155. For example, the entry 160D may correspond to a first segment in the next cycle of the pattern 155 (e.g., represented by the entry 160B) but the encoder has not yet outputted the next three segments in the cycle which are represented by the entry 160C. Thus, the manifest 150 can store entries that are leftovers or "one-offs" that do not match the pattern. As the encoder outputs additional segments (e.g., the other three segments that correspond to the entry 160C), the entry 160D may be deleted from the manifest 150 and the @r value for the pattern 155 in the entry 160A is incremented.

Figure 2:
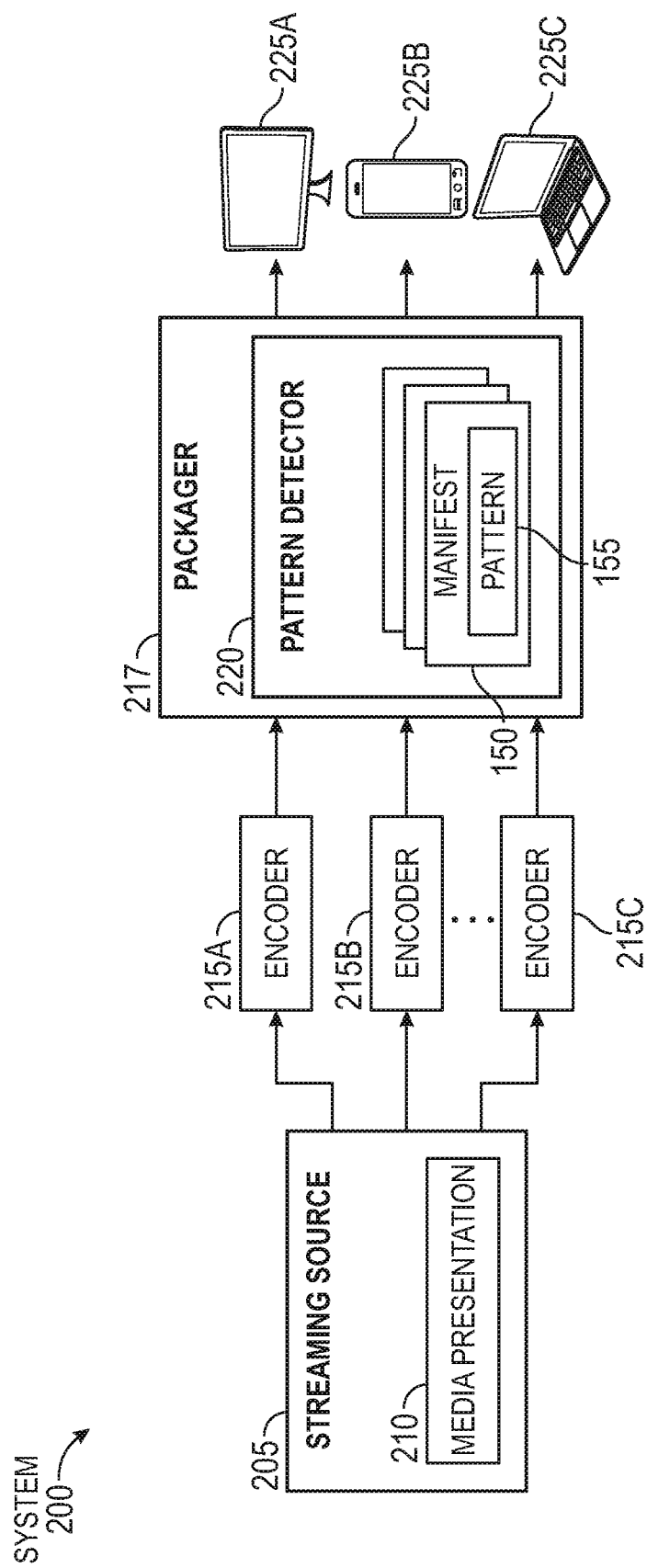
FIG. 2 illustrates a system for detecting patterns used by different encoders, according to various embodiments.

FIG. 2 illustrates a system 200 for detecting patterns used by different encoders 215, according to various embodiments. As shown, the system 200 includes a streaming 205 which transmits a media presentation 210 to one of the encoders 215. These presentations 210 can include TV shows, movies, advertisements, live streaming events (e.g., gaming streams, sports streams, news programs, etc.), product reviews, how-to videos, and the like. The streaming source 205 may be part of a subscription service (e.g., video-on-demand), a free video service which includes advertisements, or other content delivery service. Moreover, the streaming source 205 can represent multiple different sources for multiple different streaming services.

The system 200 also includes the encoders 215 which may use different algorithms or techniques to encode the media presentations 210 into audio and video segments to perform streaming—e.g., HTTP streaming. The system 200 can be used with different types or protocols of HTTP streaming such as Dynamic Adaptive Streaming over HTTP (DASH), HTTP Live Streaming (HLS), the Smooth Streaming protocol, or other future or current protocols. The syntax used by these HTTP streaming protocols may vary. While the syntax illustrated in this disclosure is for the DASH protocol, it can be modified for other types of HTTP streaming protocols.

The encoders 215 transmit audio and video segments to a packager 217 that includes a pattern detector 220. In one embodiment, the audio and video segments are transmitted as part of a timeline. Rather than sending all the segments at once, the encoders 215 can encode different portions of the media presentation 210 at different times. That is, the encoder 215 may send different chunks of audio and video segments representing the media presentation at different times to the packager 217.

As mentioned above, the encoders 215 can generate the audio and video segments such that the segments align at a predetermined interval—e.g., every 8 seconds. As shown in FIG. 1A, the ends of the video segment 105A and the audio segment 110A align at the end of the cycle 100. Also, the start points of the video and audio segments forming the next cycle 100 would also align. However, the end/start points of the audio and video segments within the cycle 100 do not align. In FIG. 1A, the audio and video segments are misaligned by 5-20 milliseconds within the cycle 100.

In one embodiment, the misalignment of the audio and video segments in each of the encoders 215 may differ. That is, although each of the encoders 215A-C may generate a cycle every 8 seconds where the audio and video segments align, the misalignment of those audio and video segments (and even the number of audio and video segments) in the cycle can vary. For example, the duration of the audio segments generated by the encoder 215A may be different from the duration of the audio segments generated by the encoder 215B and the encoder 215C. Moreover, the duration of the video segments generated by the encoders 215 may also be different (or they can be the same). As a result of these differences, the pattern used by each of the encoders 215 to satisfy the predetermined cycle duration may differ. For example, the encoder 215A may generate audio segments that are 5 milliseconds (ms) longer than its video segments, while the encoder 215B generates audio segments that are 7 ms longer than its video segments and the encoder 215C generates audio segments that are 9 ms longer than its video segments. These encoders 215 would include truncated audio segments of different durations in order to satisfy the predefined cycle interval.

In one embodiment, the manner in which the encoders 215 generate the audio and video segments to satisfy the predetermined cycle interval may be unknown. For example, a content delivery network (CDN) (or the packager 217) may not know the duration of the video and audio segments used by each of the encoders 215 to ensure every 8 seconds, the ends of the segments align. The CDN may not know (or control) which of the encoders 215 is used to encode the media presentation 210. For example, the CDN may be coupled to multiple different streaming sources 205 which each use a different encoder 215, or the encoders 215 may be swapped out for a different encoders 215 without informing the CDN or the packager 217. Thus, the embodiments herein describe techniques for the pattern detector 220 to dynamically determine the pattern used by the encoder 215 selected to encode the media presentation 210.

As described in more detail below, the pattern detector 220 evaluates the audio and video segments received from the encoders 215 to determine their respective patterns 155. In one embodiment, the duration of the video segments are constant, in which case, these segments can be represented by a single entry in the manifest like the entry 115 illustrated in FIG. 1B. However, the duration of the audio segments may vary, in which case, these segments are represented in the manifest 150 using the pattern 155, an example of which is also illustrated in FIG. 1B. The pattern 155 for each of the encoders 215 may have different numbers of audio segments and/or different durations of the audio segments.

The pattern detector 220 provides the manifest 150 to user devices 225. Although not shown in FIG. 2, the encoded audio and video segments generated by the encoders 215 are also provided to the user devices 225. Using the manifest 150, the user devices 225 can decode the audio and video segments and output the media presentations 210.

Figure 3:
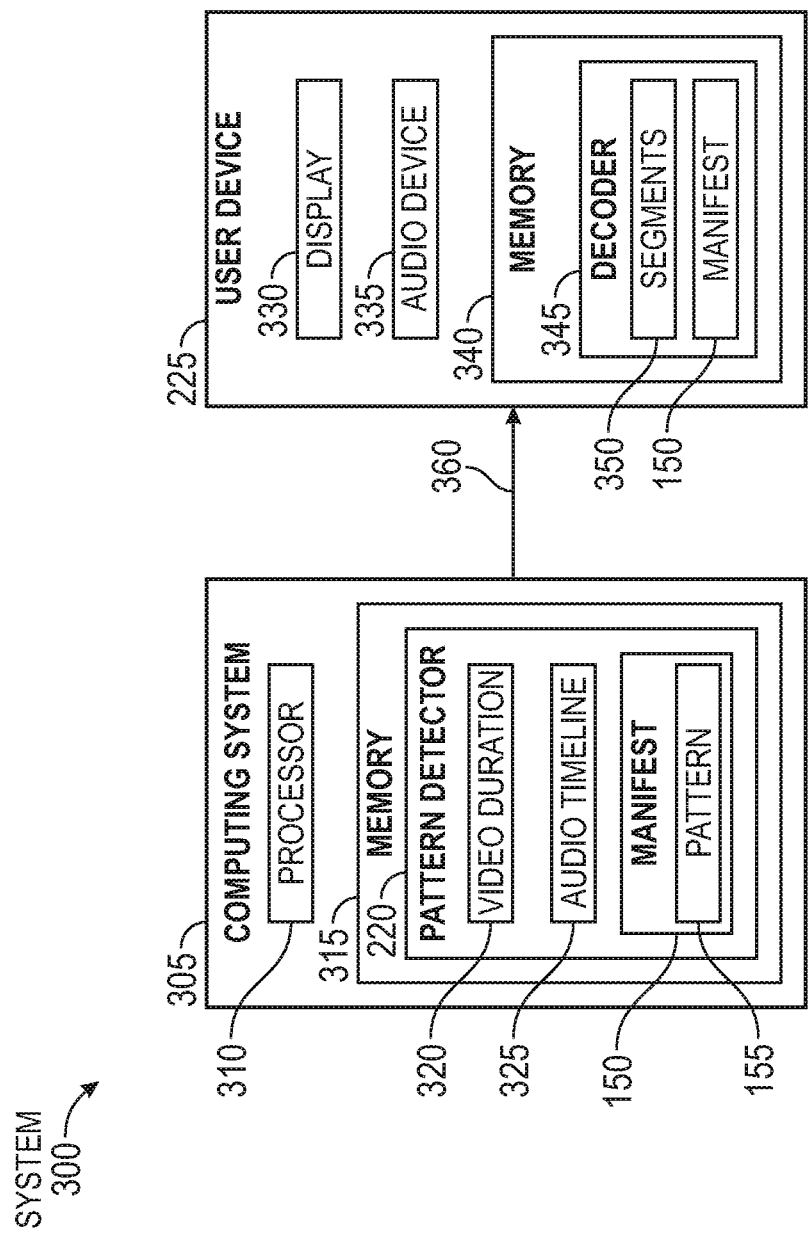
FIG. 3 is a block diagram of a system for identifying a pattern for a manifest, according to various embodiments.

FIG. 3 is a block diagram of a system 300 for identifying a pattern to be used in a manifest, according to various embodiments. The system 300 illustrates further details of a system 300 used to execute the pattern detector 220 and the user devices 225. A computing system 305 includes a processor 310 that represents any number of processing elements that each can include any number of processing cores. The computing system 305 also includes memory 315 can include volatile memory, non-volatile memory, and combinations thereof.

The memory 315 includes the pattern detector 220 (e.g., a software application) that processes received audio and video segments to determine a pattern 155 used by the encoder. The pattern detector 220 then inserts this pattern 155 into the manifest 150 to represent the audio segments (assuming their durations change). Of course, if helpful, the video segments may also be represented as a pattern in the manifest 150. To detect the pattern 155 for a specific encoder, the pattern detector 220 identifies a video duration 320 and an audio timeline 325. Using this information, the pattern detector 220 determines the number of audio segments in the pattern 155 and the durations of each of those segments as described below.

As shown by arrow 360, the pattern detector 220 transmits the manifest 150 to the user device 225. Because the audio segments can be represented in the manifest as the pattern 155 rather than separate entries, the size of the manifest 150 is greatly reduced. For example, if the media presentation is 64 seconds and the pattern 155 represents a cycle with a duration of 8 seconds, the 8 cycles in the media presentation can be represented by the pattern 155. This memory savings scales linearly as the length of the media presentation increases. Using the pattern 155 saves memory in both the computing system 305 and the local memory 340 in the user device 225 and also reduces the amount of bandwidth used to transmit the manifest 150 to the user device 225.

The user device 225 includes a display 330, an audio device 335 (e.g., a headphone jack, audio speakers, etc.), and memory 340 which can include volatile memory, non-volatile memory, and combinations thereof. The memory 340 includes a decoder 345 (e.g., a software application) that decodes the segments 350 generated by the upstream encoder using the manifest 150 received from the pattern detector 220. The decoded video data can be output by the display 330 while the decoded audio data is output using the audio device 335.

Figure 4:
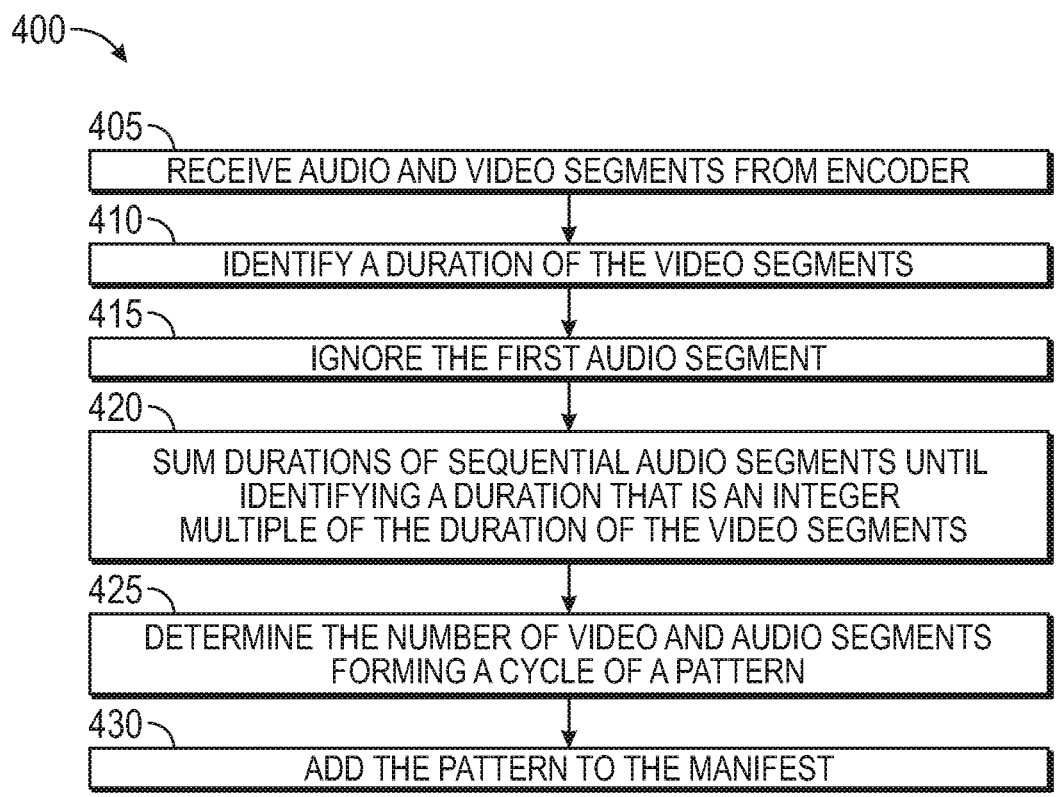
FIG. 4 is a flowchart for identifying a pattern to be used in a manifest, according to various embodiments.

FIG. 4 is a flowchart of a method 400 for identifying a pattern in a manifest, according to various embodiments. At block 405, the pattern detector receives audio and video segments from the encoder. In one embodiment, the pattern detector does not know the various durations of the segments used by the encoder to generate a repeating cycle of a pattern. For example, it may be the first time the pattern detector has communicated with the encoder, or the system administrator for a streaming service may have switched to a different encoder. In another example, the streaming service may use different encoders depending on the type of media presentation being streamed to a user device. Regardless, the pattern detector can use the method 400 to dynamically identify a pattern (e.g., during runtime or during operation) used by the encoder when altering the duration of the audio segments to satisfy a predetermined cycle interval.

At block 410, the pattern detector identifies a duration of the video segments. In method 400, it is assumed that the duration of the video segments generated by the encoder are constant (i.e., are the same), which is typical of video encoding techniques. However, the embodiments herein could be used with an encoder where the duration of the audio segments are constant and the duration of the video segments changes in a cycle. In that case, rather than determining a duration of the video segment, the pattern encoder would determine a duration of the audio segments at block 410.

At block 415, the pattern detector ignores the first audio segment in the timeline of audio segments received at block 405. Some encoders output discontinuities when switching between media presentations. For example, when inserting advertisements between different portions of a video, the advertisements may begin with an audio segment that is not part of the pattern used by the encoder. Thus, if the first audio segment were used to identify the pattern of the audio segments used in the advertisement, the pattern detector may not identify any pattern, or identify a pattern that does not repeat, which would not reduce the size of the manifest. Thus, when identifying a pattern for a different media presentation, the pattern detector may ignore the first audio segment in the audio timeline to prevent the possibility of a discontinuity from preventing the pattern detector from recognizing the pattern. Even if the audio timeline does not include a discontinuity, ignoring the first audio segment does not negatively impact pattern recognition. Instead, a separate entry representing the first audio segment (separate from the entries in the pattern) can be stored first in the manifest. The pattern can then represent the remaining audio segments in the timeline.

At block 420, the pattern detector sums durations of sequential audio segments in the timeline until identifying a duration that is an integer multiple of the duration of the video segment determined at block 410. Using FIG. 1A as an example, the duration of the video segments is 2 seconds while the durations of the audio segments is either 2.0053 or 1.984 seconds. As such, it requires adding the duration of four audio segments to identify an integer multiple of the duration of the video segments (e.g., 8 seconds). Note that it would still require four audio segments even when the pattern detector ignores the first audio segment in the timeline (although the ordering of the entries in that pattern may be different, with two audio segments with a duration of 2.0053 seconds, followed by audio segment with a duration of 1.984 seconds, followed by another audio segment with a duration of 2.0053 seconds).

At block 425, the pattern detector determines the number of video and audio segments forming a cycle of the pattern. The pattern detector can then later determine when the pattern repeats when additional audio and video segments are received from the encoder. Again using the example in FIG. 1A, the pattern detector can evaluate each sequential group of four audio segments 110 to ensure they have the same durations (and in the same order) as the audio segments whose durations added up to yield an integer multiple of the duration of the video segments.

At block 430, the pattern detector adds the pattern to the manifest. As shown in FIG. 1B, the pattern 155 includes the special syntax "Pattern" which indicates to the decoder in the user device that the entries 160A-160C identified within that syntax repeat according to the repeat indicator "r". Thus, after receiving the manifest, the decoder can expand, or extrapolate, the audio segments to identify both the timestamp and duration of each of the audio segments.

Although not mentioned in the method 400, the pattern detector can also add an entry to the manifest that represents the timestamp and duration of each of the video segments, such as the entry 115 in FIG. 1B. Further, the pattern detector may add a separate entry in the manifest (e.g., at a location before the pattern) for the first audio segment which was ignored by the pattern detector at block 415 when attempting to recognize the pattern used by the encoder.

Figure 5:
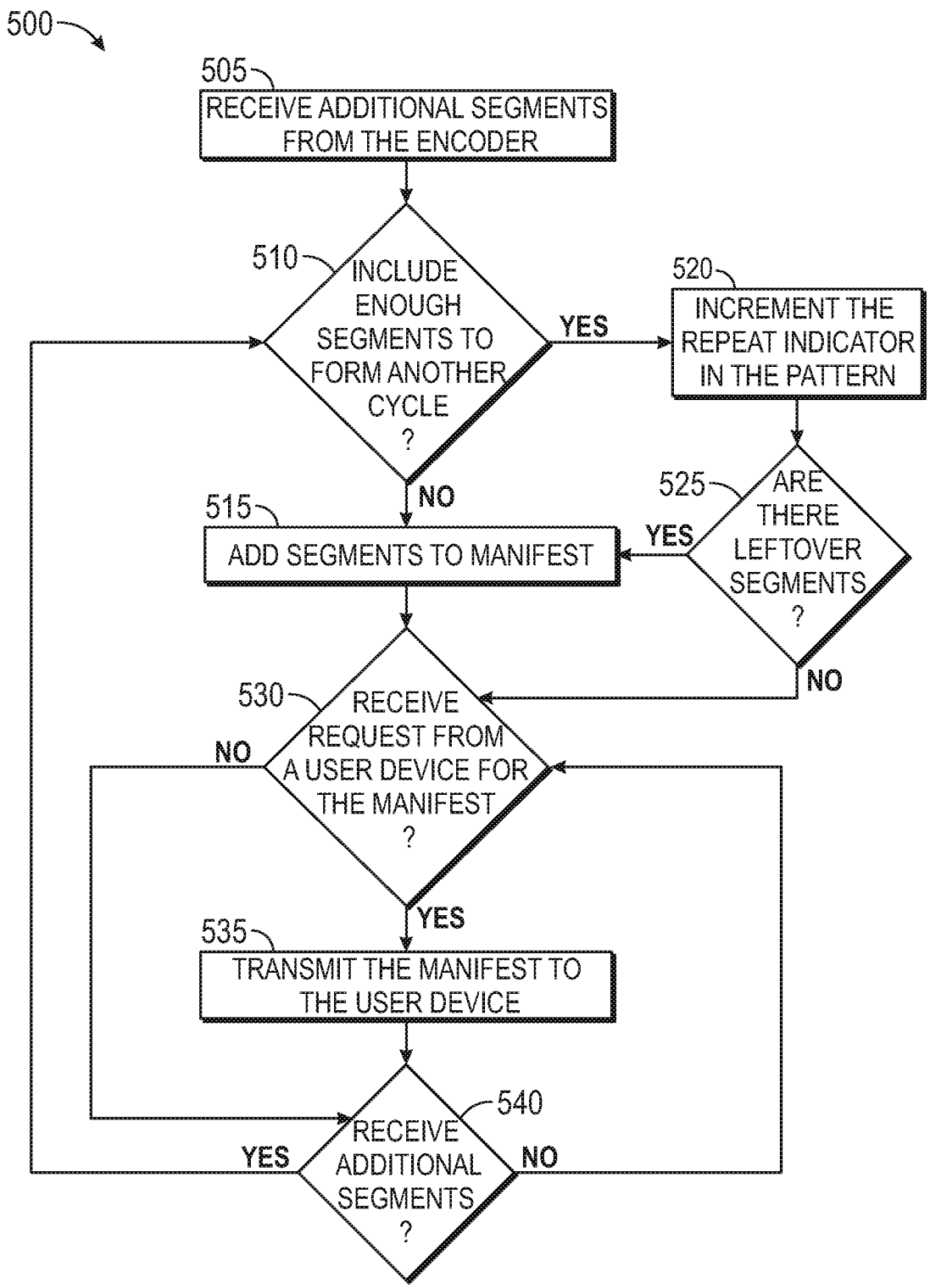
FIG. 5 is a flowchart for adding cycles to a pattern in a manifest, according to various embodiments.

FIG. 5 is a flowchart of a method 500 for adding cycles to a pattern in a manifest, according to various embodiments. In one embodiment, the method 500 begins after recognizing a pattern used by the encoder when transmitting audio segments (or video segments) with varying durations.

At block 505, the pattern detector receives additional segments from the encoder. The pattern detector uses the method 500 to incorporate the newly received segments into the manifest. For example, the encoder may transmit the segments as part of a live stream, or when the media presentation was previously recorded and saved in the data store. In both cases, the encoder may transmit chunks of the audio and video segments forming the media presentation to the pattern detector as indicated by the particular HTTP streaming protocol being used.

At block 510, the pattern detector determines whether the received audio segments include enough segments to form another cycle in the pattern. For example, each cycle may include four audio segments, but the pattern detector may have received only three additional audio segments at block 505. In that case, the method 500 proceeds to block 515 where the audio segments are added to the manifest as separate entries rather than being represented by the pattern. However, if the number of audio segments is equal to or exceeds the number of audio segments in a cycle of the pattern, the method 500 proceeds to block 520 where the pattern detector increments the repeat indicator in the pattern. That is, the "r" value in the first entry of the pattern is incremented.

At block 525, the pattern detector determines whether there are any leftover audio segments that were not incorporated into the pattern in the manifest. For example, the pattern detector may have received six audio segments from the encoder but the cycle includes only four segments. The remaining two of the audio segments may be part of the next cycle in the pattern. If there are leftover segments, the method 500 proceeds to block 515 and stores a separate entry (or entries) representing these leftover segments in the manifest. An example of leftover audio segment is the entry 160D in FIG. 1B. If, however, there are no leftover audio segments (e.g., the number of received audio segments is an integer multiple of the number of audio segments in the cycle of the pattern), the method 500 skips block 515 and proceeds to block 530.

Although not explicitly illustrated in method 500, the pattern detector also updates the repeat indicator for the video segments received at block 505. For example, if the pattern detector received four additional video segments, it increments the repeat indicator for the entry representing the video segments in the manifest by four.

At block 530, the pattern detector determines whether it has received a request from a user device for the manifest. Using the method 500, the pattern detector can continually update the manifest. The user device can, at intervals, request a current version of the manifest. If such a request is received, at block 535, the pattern interval transmits the current version of the manifest to the user device. If not, the method 500 skips block 535 and proceeds to block 540 where the pattern detector determines whether it has received additional audio and video segments from the encoder. If not, the method 500 returns to block 530 to determine whether the user device has requested an updated version of the manifest. That is, blocks 530, 535, and 540 can repeat until the encoder transmits additional segments to the pattern detector (or until the encoder indicates that it has finished transmitting all the segments in a media presentation, which is discussed below).

Once the pattern detector receives additional segments, the method 500 returns to block 510 to determine whether the newly received audio segments are enough to complete another cycle in the pattern. The pattern detector can add the newly received audio segments to any leftover audio segments in the manifest. For example, if at block 540 the pattern detector received six additional audio segments and the manifest already had separate entries for two leftover audio segments, assuming each cycle has four audio segments, at block 520 the pattern detector increments the repeat indicator in the pattern by two. Moreover, the pattern detector deletes the two entries for the leftover audio segments from the manifest. If the user device requested the a version of the manifest before receiving the new segments at block 540, the pattern would have a repeat indicator that is two less than its current value and would include two entries for the leftover audio segments separate from the entries in the pattern.

The method 500 can repeat to continuously update the manifest and the entries therein. Thus, regardless of the frequency at which the user device queries the pattern detector for the manifest, the pattern detector can have an up-to-date manifest that corresponds to the audio and video segments that have been output by the encoder.

Figure 6:
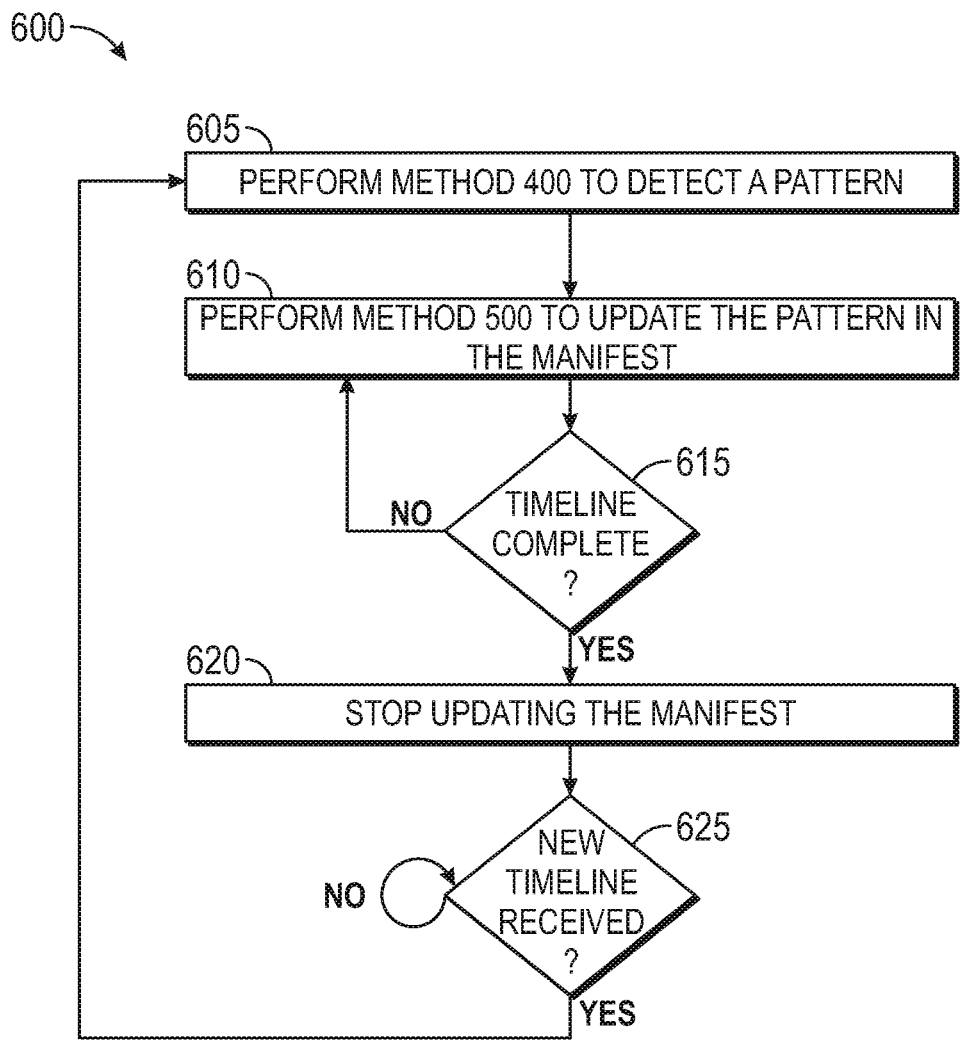
FIG. 6 is a flowchart for identifying patterns for different media presentations, according to various embodiments.

FIG. 6 is a flowchart of a method 600 for identifying patterns for different media presentations, according to various embodiments. The method 600 illustrates a high-level method that the pattern detector can perform to manage multiple timelines sent by the same encoder or multiple encoders.

At block 605, the pattern detector receives a new timeline and performs the method 400 to detect a pattern used by the encoder to transmit segments with varying durations (e.g., audio segments). As mentioned above, one type of the segments (e.g., either the video or the audio segments) has a constant duration while the other segments have durations that vary according to a defined pattern, which varies depending on the type of encoder.

At block 610, the pattern detector performs the method 500 to update the pattern in the manifest as new segments are received from the encoder. That is, the pattern detector can update the repeat indicator in the pattern and add separate entries in the manifest (e.g., entries for leftover segments as well as a first audio segment that may have been ignored when performing block 605).

At block 615, the pattern detector determined whether the timeline is complete. That is, the pattern indicator determines whether the encoder has finished the current media presentation and is going to send a new timeline for a different media presentation. For example, the encoder may use different timelines for a video and an advertisement that is interjected into the media presentation. The encoder can also use different patterns when sending the audio segments for the video and when sending the audio segments for the advertisement. In one embodiment, the encoder informs the pattern detector that the current timeline has ended, thereby indicating that the next audio segments received by the pattern detector may not use the same pattern as the previous audio segments.

Assuming the timeline is not complete, the method 600 returns to block 610 where additional segments are received and processed using the method 500. However, once the timeline is complete (e.g., the encoder has finished transmitting the current media presentation), the method 600 proceeds to block 620 where the pattern detector stops updating the manifest.

At block 625, the pattern detector waits until segments corresponding to a new timeline (e.g., a new media presentation) are received. This new timeline may be sent by a different encoder which uses a different pattern when transmitting audio segment, or from the same encoder but is for a different media presentation which results in a different pattern. For example, a different type of audio encoding may be used when encoding audio data for a television show versus a movie versus an advertisement versus a product review, thereby resulting in different patterns. In response, the method 600 returns to block 605 where the pattern detector can repeat the method 400 to detect the pattern. In this manner, the pattern detector can process different timelines for different media presentations and encoders.

Figure 7:
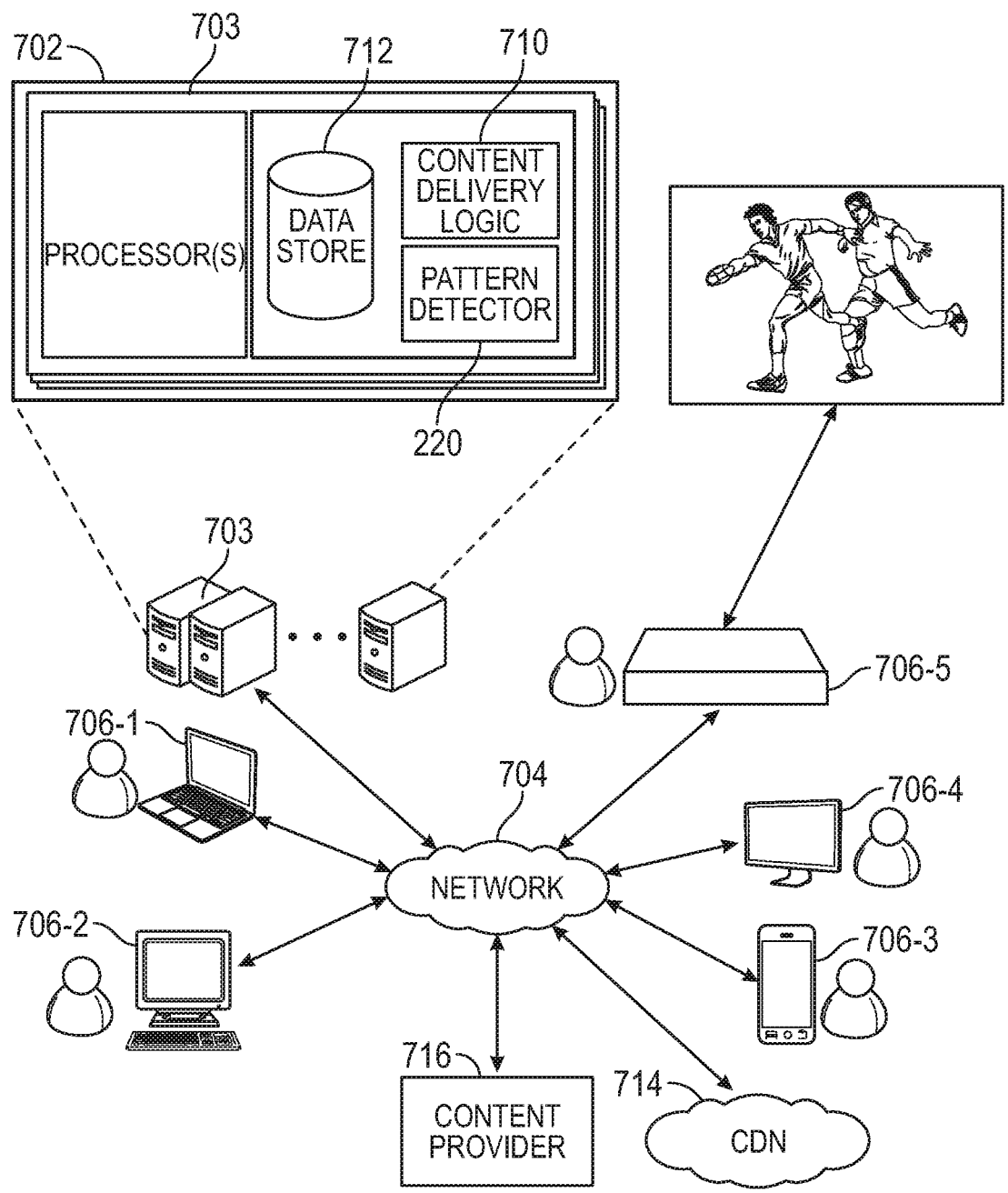
FIG. 7 illustrates an example of a computing environment in which a video content service provides content via network to a variety of client devices, according to various embodiments.

FIG. 7 illustrates an example of a computing environment in which a video content service 702 provides content via network 704 to a variety of user devices (706-1 through 706-5) in accordance with the techniques described herein. The content may include live or broadcast content, video-on-demand (VOD) content, and/or VOD-style content such as, for example, just-after-broadcast or JAB content (video content that is derived from a live or broadcast stream of video content and made available shortly after the end of the event for delivery in a manner similar to VOD content).

Content service 702 may conform to any of a wide variety of architectures such as, for example, a services platform deployed at one or more co-locations, each implemented with one or more servers 703. Network 704 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. User devices 706 (e.g., the user devices 225 in FIG. 2) may be any suitable device capable of connecting to network 704 and consuming content provided by service 702. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

For the sake of simplicity, content service 702 is described as if it is integrated with the platform(s) that provides content and manifests to user devices. However, it will be understood that content service 702 may provide access to content in conjunction with one or more content delivery networks (e.g., CDN 714) that may or may not be independent of content service 702. In addition, the source(s) of content may or may not be independent of content service 702 (e.g., as represented by content provider 716). The range of variations known to those of skill in the art are contemplated to be within the scope of this disclosure.

Some of the implementations enabled by the present disclosure contemplate logic resident on the user devices consuming video content from content service 702; such logic might be configured to handle, for example, the parsing of manifest data to generate requests for content segments. Such logic might be part of an existing algorithm or module on the client device or implemented to work in conjunction with such an algorithm or module.

It should also be noted that implementations are contemplated in which, in addition to content delivery logic 710 (which facilitates various aspects of content delivery to user devices 706), content service 702 includes other types of logic, e.g., pattern detector 220 that facilitates efficient representation of manifest data as enabled by the present disclosure. Such logic might be part of a packager in a content encoding and packaging pipeline. Alternatively, such logic might be separate from the components of such a pipeline, taking a manifest or playlist generated by the packager and compressing the information as described herein.

In addition to providing access to content, content service 702 may also include a variety of information related to the content (e.g., subtitle information, and other associated metadata and manifests in data store 712 to which service 702 provides access). Alternatively, such information associated with and/or about the content, as well as the content itself may be provided and/or hosted by one or more separate platforms, e.g., CDN 714. It should be noted that, while the content delivery logic 710, the pattern detector 220, and the data store 712 are shown as integrated with content service 702, implementations are contemplated in which any of these operate remotely from the associated content service, and/or are under the control of an independent entity. From these examples, those of skill in the art will understand the diversity of use cases to which the techniques described herein are applicable.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the pattern detector 220) or related data available in the cloud. For example, the pattern detector 220 could execute on a computing system in the cloud and generate the compact manifest data described above. In such a case, the pattern detector 220 could update the pattern entries in the manifest and store the updated manifest at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving, as part of a HTTP streaming protocol, a sequence of video segments and a sequence of audio segments forming at least a portion of a media presentation, wherein the sequence of audio segments includes first audio segments of a first duration, and second audio segments of a second duration different from the first duration;
   identifying a duration of one of the video segments, wherein the video segments all have a same duration;
   summing durations of the sequence of audio segments until the summed duration is an integer multiple of the duration of the one video segment;
   determining a number of the audio segments used to form the summed duration, wherein the number of audio segments forms a cycle of a pattern used by an encoder when generating the audio segments;
   adding the pattern to a manifest of the media presentation, wherein the pattern comprises at least two entries representing a first audio segment selected from the first audio segments and a second audio segment selected from the second audio segments, and wherein the pattern comprises a repeat indicator indicating a number of times the pattern repeats in the manifest; and
   transmitting the manifest to a user device to enable the user device to stream the media presentation.

2. The method of claim 1, wherein the pattern comprises a third entry including a timestamp indicating when the pattern begins in the media presentation, wherein the at least two entries comprise different duration values.

3. The method of claim 1, wherein one of the at least two entries comprises a separate repeat indicator indicating a number of times that the entry repeats every time the pattern repeats in the manifest.

4. The method of claim 1, wherein the pattern, when added to the manifest, comprises a beginning syntax and an end syntax, wherein the at least two entries are between the beginning syntax and the end syntax.

5. The method of claim 1, further comprising:
   determining a number of video segments in the media presentation; and
   adding a third entry to the manifest representing the number of video segments, wherein the third entry is separate from the pattern in the manifest, and wherein the third entry comprises a timestamp, a duration value, and a separate repeat indicator representing the number of video segments in the media presentation.

6. A computer-implemented method, comprising:
   receiving, as part of a streaming protocol, a first type of segment and a sequence of a second type of segments forming at least a portion of a media presentation, wherein the second type of segments include first segments of a first duration and second segments of a second duration different from the first duration;
   identifying a duration of the first type of segment;
   identifying a combined duration of the sequence of the second type of segments that is an integer multiple of the duration of the first type of segment; and
   adding a pattern to a manifest of the media presentation based on determining a number of the second type of segments used to form the combined duration, wherein the pattern comprises duration values representing the first segments and the second segments, and wherein the pattern comprises a repeat indicator indicating a number of times the pattern repeats in the manifest.

7. The method of claim 6, wherein the first type of segment comprises a video segment of the media presentation and the second type of segments comprises audio segments of the media presentation.

8. The method of claim 6, wherein the pattern comprises a first entry including a timestamp indicating when the pattern begins in the media presentation, a second entry including a first duration value of the duration values indicating a duration of the first segments, and a third entry including a second duration value of the duration values indicating a duration of the second segments.

9. The method of claim 8, wherein the first entry comprises the repeat indicator and one of the second or third entries comprises a separate repeat indicator indicating a number of times the entry repeats every time the pattern repeats in the manifest.

10. The method of claim 6, further comprising, after adding the pattern to the manifest:

receiving first additional segments from an encoder;

determining that the first additional segments include a sufficient number of the second type of segments to form another cycle of the pattern; and incrementing the repeat indicator in the pattern.

11. The method of claim 10, further comprising:

identifying a leftover segment in the first additional segments not represented by the pattern; and adding an entry to the manifest representing the leftover segment, wherein the entry is separate from the pattern.

12. The method of claim 11, further comprising, after adding the entry representing the leftover segment:

receiving second additional segments from the encoder;

determining that the second additional segments and the leftover segment include a sufficient number of the second type of segments to form another cycle of the pattern;

incrementing the repeat indicator in the pattern of the manifest; and deleting the entry representing the leftover segment from the manifest.

13. The method of claim 6, wherein identifying the combined duration of the sequence of the second type of segments comprises:

ignoring a duration of first segment in the sequence of the second type of segments, wherein the combined duration is a combination of durations of a plurality of the second type of segments that excludes the first segment.

14. The method of claim 6, further comprising:

repeatedly receiving additional segments from an encoder;

updating the repeat indicator in the pattern to represent the additional segments;

receiving, from a user device, a plurality of requests for the manifest while repeatedly receiving the additional segments; and transmitting a plurality of versions of the manifest to the user device, wherein the repeat indicator of the pattern has a different value in each of the plurality of versions of the manifest.

15. A non-transitory computer-readable storage medium storing instructions executable to perform an operation for updating a manifest for streaming a media presentation, the operation comprising:

receiving a first type of segment and a sequence of a second type of segments forming at least a portion of the media presentation, wherein the second type of segments include first segments of a first duration and second segments of a second duration different from the first duration;

identifying a duration of the first type of segment;

identifying a combined duration of the sequence of the second type of segments that is an integer multiple of the duration of the first type of segment; and adding a pattern to the manifest based on determining a number of the second type of segments used to form the combined duration, wherein the pattern comprises duration values representing the first segments and the second segments, and wherein the pattern comprises a repeat indicator indicating a number of times the pattern repeats in the manifest.

16. The computer-readable storage medium of claim 15, wherein the first type of segment comprises a video segment of the media presentation and the second type of segments comprises audio segments of the media presentation.

17. The computer-readable storage medium of claim 15, wherein the pattern comprises a first entry including a timestamp when the pattern begins in the media presentation, a second entry including a first duration value of the duration values indicating a duration of the first segments, and a third entry including a second duration value of the duration values indicating a duration of the second segments.

18. The computer-readable storage medium of claim 15, wherein the operation further comprises, after adding the pattern to the manifest:

receiving first additional segments from an encoder;

determining that the first additional segments include a sufficient number of the second type of segments to form another cycle of the pattern; and incrementing the repeat indicator in the pattern.

19. The computer-readable storage medium of claim 18, wherein the operation further comprises:

identifying a leftover segment in the first additional segments not represented by the pattern; and adding an entry to the manifest representing the leftover segment, wherein the entry is separate from the pattern.

20. The computer-readable storage medium of claim 19, wherein the operation further comprises, after adding the entry representing the leftover segment:

receiving second additional segments from the encoder;

determining that the second additional segments and the leftover segment include a sufficient number of the second type of segments to form another cycle of the pattern;

incrementing the repeat indicator in the pattern; and deleting the entry representing the leftover segment from the manifest.

* * * * *